United States Patent [19]

Grimmer et al.

[11] Patent Number: 4,882,239

[45] Date of Patent: Nov. 21, 1989

[54] LIGHT-RECHARGEABLE BATTERY

[75] Inventors: Derrick P. Grimmer, St. Paul; Robert P. Wenz, Cottage Grove, both of Minn.

[73] Assignee: Minnesota Mining and Manufacturing Company, St. Paul, Minn.

[21] Appl. No.: 165,488

[22] Filed: Mar. 8, 1988

[51] Int. Cl.$^4$ .......................................... H01M 14/00
[52] U.S. Cl. .......................................... 429/7; 429/9; 136/291
[58] Field of Search ........................ 136/291; 429/7, 9

[56] References Cited

U.S. PATENT DOCUMENTS

| | | | |
|---|---|---|---|
| Re. 29,833 | 11/1978 | Mlavsky | 136/89 |
| 3,411,050 | 11/1968 | Middleton et al. | 317/234 |
| 3,778,312 | 12/1973 | Karius | 136/89 |
| 3,890,776 | 6/1975 | Urushida | 58/23 C |
| 3,921,049 | 11/1975 | Mellors et al. | 320/2 |
| 3,928,960 | 12/1975 | Reese | 58/152 |
| 3,952,324 | 4/1976 | Wolff et al. | 357/19 |
| 3,976,508 | 8/1976 | Mlvasky | 136/89 |
| 3,979,656 | 9/1976 | Takeda et al. | 320/2 |
| 4,122,396 | 10/1978 | Grazier et al. | 325/492 |
| 4,136,436 | 1/1979 | Kilby et al. | 29/252 |
| 4,164,698 | 8/1979 | Kleeberg | 320/2 |
| 4,209,346 | 6/1980 | King | 136/89 |
| 4,240,021 | 12/1980 | Kashima et al. | 320/2 |
| 4,243,928 | 1/1981 | Nzaimek | 320/2 |
| 4,258,108 | 3/1981 | Glasor | 429/185 X |
| 4,266,178 | 5/1981 | Asakawa | 320/39 |
| 4,293,731 | 10/1981 | Schweig et al. | 136/245 |
| 4,293,808 | 10/1981 | Varadi et al. | 320/2 |
| 4,296,489 | 10/1981 | Mitsui | 368/205 |
| 4,311,953 | 1/1982 | Fukuda et al. | 320/2 |
| 4,350,458 | 9/1982 | Murahara et al. | 401/145 |
| 4,384,259 | 5/1983 | Capewell | 330/10 |
| 4,419,530 | 12/1983 | Nath | 136/251 |
| 4,422,031 | 12/1983 | Vigerstol | 320/2 |
| 4,434,395 | 2/1984 | Higuchi | 320/1 |
| 4,454,372 | 6/1984 | Appleby | 136/250 |
| 4,481,265 | 11/1984 | Ezawa | 429/9 |
| 4,481,378 | 11/1984 | Lesk | 136/244 |
| 4,492,743 | 1/1985 | Howe | 429/111 |
| 4,508,932 | 4/1985 | Zukotynski | 136/258 |
| 4,514,579 | 4/1985 | Hanak | 136/249 |
| 4,514,583 | 4/1985 | Izu et al. | 136/259 |
| 4,530,739 | 7/1985 | Hanak et al. | 204/4 |
| 4,539,516 | 9/1985 | Thompson | 320/48 |
| 4,548,862 | 10/1985 | Hartman | 428/323 |
| 4,563,727 | 1/1986 | Curiel | 429/9 X |
| 4,612,409 | 9/1986 | Hamakawa et al. | 136/244 |
| 4,634,072 | 1/1987 | Stealy | 242/84.1 A |
| 4,636,579 | 1/1987 | Hanak et al. | 136/2 |
| 4,648,013 | 3/1987 | Curiel | 362/183 |
| 4,651,080 | 3/1987 | Wallace | 320/2 |
| 4,661,758 | 4/1987 | Whittaker | 320/21 |
| 4,667,058 | 5/1987 | Catalano et al. | 136/244 |
| 4,686,411 | 8/1987 | Sands | 313/271 |
| 4,740,431 | 4/1988 | Little | 429/9 |

FOREIGN PATENT DOCUMENTS

| | | | |
|---|---|---|---|
| 57-75533 | 5/1982 | Japan . | |
| 57-75534 | 5/1982 | Japan . | |
| 57-75535 | 5/1982 | Japan . | |
| 60-158565 | 8/1985 | Japan | 136/252 |
| 61-93562 | 5/1986 | Japan . | |

OTHER PUBLICATIONS

MJR Company, 2-Page Brochure Entitled, "MJR Introduces the Most Exciting Rechargeable Battery of our Time. SN 2000", Rev. 2-26/86.

Primary Examiner—Stephen J. Kalafut
Attorney, Agent, or Firm—Kinney & Lange

[57] ABSTRACT

A light rechargeable battery includes a rechargeable cell having an elongated, tubular case characterized by a longitudinal axis, and a pair of terminals extending therefrom. Two or more thin-film solar cells fabricated on a flexible substrate and interconnected in a series circuit between the terminals are circumferentially positioned around the rechargeable cell on the exterior of the case. A blocking diode is connected in the series circuit with the solar cells. The solar cells are coupled to the terminals by bus bars. A transparent shrink wrap cover secures the solar cells to the case of the rechargeable cell.

9 Claims, 1 Drawing Sheet

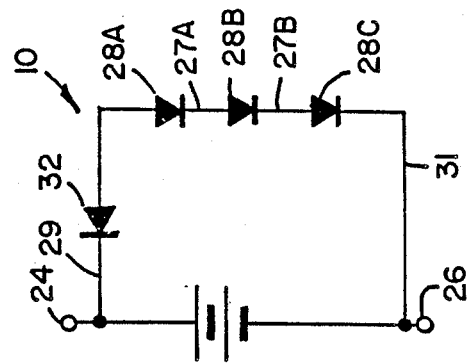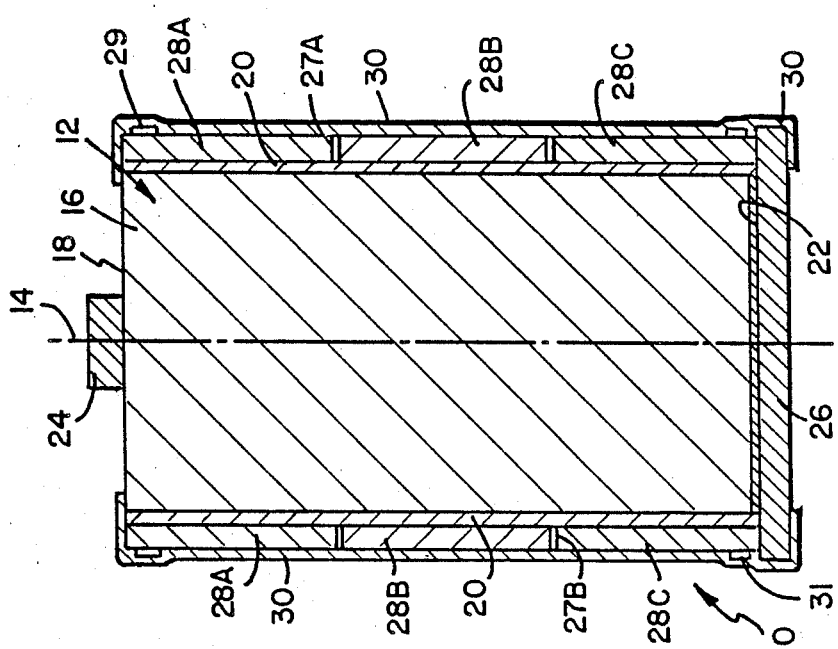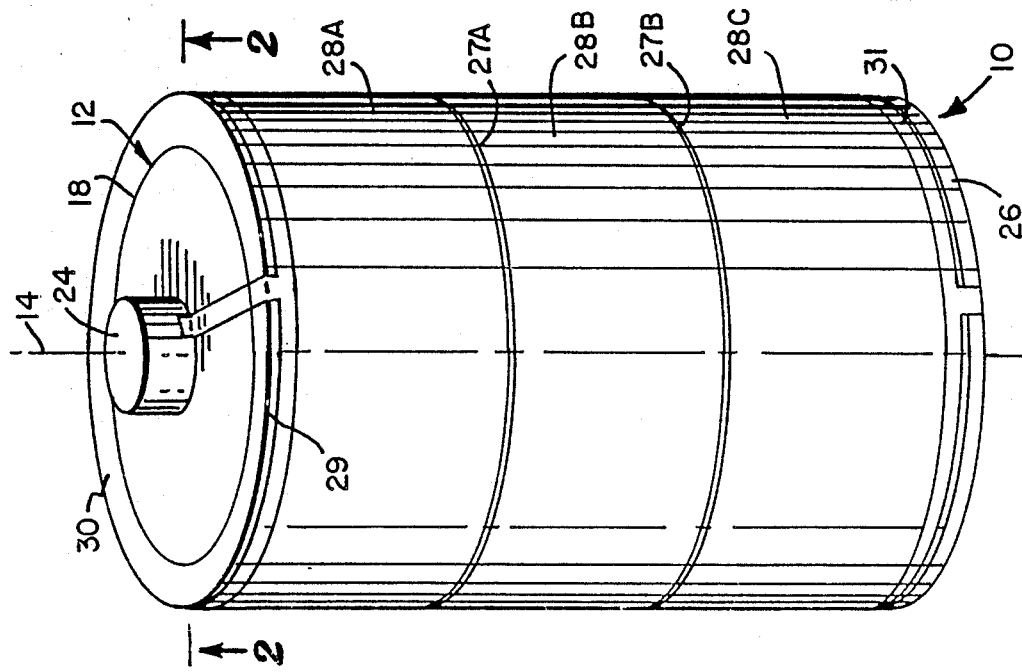

LIGHT-RECHARGEABLE BATTERY

BACKGROUND OF THE INVENTION

1. Field of the Invention

The present invention relates generally to rechargeable batteries. In particular, the present invention is a light-rechargeable battery.

2. Description of the Prior Art

Electrically rechargeable batteries are well known and in widespread use. Batteries of this type must be recharged using a charging unit which is typically powered by an AC line source or car battery. A major drawback of these rechargeable batteries, as well as that of non-rechargeable batteries, is that their output falls to unusable levels abruptly, without forewarning, and often when the user is away from a charger or source of power.

Light-rechargeable batteries are also known and disclosed, for example, in the Curiel U.S. Pat. No. 4,563,727. This battery includes an arrangement of planar solar cells which are electrically connected in series and spaced with respect to one another about a longitudinal axis of the battery. Since the solar cells face outward on only one side of the battery, it must be properly oriented with respect to a source of light to be efficiently recharged. The structure of this battery is also relatively complicated.

Japanese Patent Publication No. 60-158565 discloses a battery having a plurality of solar cell elements mounted to its exterior. The solar cells are spaced both circumferentially and longitudinally about the battery. A battery having an amorphous silicon solar cell fabricated on a stainless steel substrate which is wrapped around the battery is shown in Japanese Patent Publication No. 57-75535.

It is evident that there is a continuing need for improved light-rechargeable batteries. A light-rechargeable battery with charging characteristics which are relatively independent of the physical orientation of the battery with respect to a source of radiant energy is desired. To be commercially viable, the battery must be relatively inexpensive to manufacture.

SUMMARY OF THE INVENTION

A light-rechargeable battery in accordance with the present invention includes a tubular rechargeable cell having a pair of terminals extending therefrom. Two or more solar cell units are interconnected in a series circuit between the terminals. Each solar cell unit extends substantially around a circumference of the cell. The solar cell units are secured to the rechargeable cell by fastener means. The light-rechargeable battery is inexpensive to manufacture, and can be efficiently recharged relatively independent of its orientation with respect to a light source. This arrangement will have a low overall series resistance, resulting in high overall efficiency.

In preferred embodiments the battery includes a blocking diode connected in the series circuit. Bus bars couple the solar cell units to the terminals. The solar cell units include thin-film solar cells fabricated on a flexible substrate. A transparent shrink wrap cover is used to secure the solar cell units to the rechargeable cell.

BRIEF DESCRIPTION OF THE DRAWINGS

FIG. 1 is a perspective view illustrating a light-rechargeable battery in accordance with the present invention.

FIG. 2 is a sectional view of the battery shown in FIG. 1.

FIG. 3 is a schematic diagram illustrating the equivalent electrical circuit of the battery shown in FIG. 1.

DETAILED DESCRIPTION OF THE PREFERRED EMBODIMENTS

A light-rechargeable battery 10 in accordance with the present invention is illustrated generally in FIGS. 1 and 2. Rechargeable battery 10 includes an elongated member, such as rechargeable cell 12, which has a longitudinal axis 14. In the embodiment shown, rechargeable cell 12 is cylindrical or circular in cross-section. Metal and/or chemical storage media 16 of cell 12 is sealed within a case formed by top wall 18, tubular side wall 20, and bottom wall 22. A relatively positive terminal or anode 24 extends from top wall 18 of cell 12, while a relatively negative terminal or cathode 26 extends from bottom wall 22. Two or more photovoltaic (PV) strips or solar cell units such as 28A, 28B, and 28C are fastened about the exterior circumference of case side wall 20, and interconnected in a series circuit by interconnect zones 27A and 27B. Photocurrent generated by solar cell units 28A–28C is coupled to rechargeable cell 12 by bus bars 29 and 31. Solar cell units 28A–28C are secured to cell 12 by a fastener such as transparent heat shrink wrapper 30.

Rechargeable cell 12 can be any known rechargeable or storage-type battery including nickel-cadmium (Ni-Cd), nickel-iron (Ni-Fe), silver-zinc (Ag-Zn), silver-cadmium (Ag-Cd), lead-acid or similar rechargeable devices. Trickle-charging or charge-maintaining means in combination with primary or "non-rechargeable" batteries (so called because standard alkaline-manganese-zinc or zinc-carbon batteries are not considered to be economically rechargeable) can also be used. Top wall 18, side wall 20 and bottom wall 22 can be formed of metal or any other material which securely encases but does not adversely affect media 16. Batteries of the type described above are well known and commercially available.

FIG. 3 is a schematic diagram illustrating the electrical interconnections between the various elements of rechargeable battery 10. As shown, solar cell units 28A–28C are interconnected in a series circuit with one another by means of interconnect zones 27A and 27B. The series interconnection of solar cell units 28A–28C is also interconnected in a series circuit with a blocking diode 32 (not shown in FIGS. 1 and 2). The series interconnection of solar cell units 28A–28C and diode 32 is connected across anode 24 and cathode 26 of rechargeable cell 12.

Solar cell units 28A–28C and diode 32 can be of any known type having suitable electrical characteristics. In one embodiment, solar cell units 28A–28C and diode 32 are thin-film hydrogenated amorphous silicon (a-Si:H) devices fabricated on a common flexible polyimide substrate. Devices of this polyimide type are described in a copending application entitled "METHOD FOR MANUFACTURING AN AMORPHOUS SILICON THIN-FILM SOLAR CELL AND SCHOTTKY BARRIER DIODE ON A COMMON SUBSTRATE", which is assigned to the same assignee as the present invention. Discrete blocking diodes 32 can also be used, as can single or multi-junction solar cells having tandem or stacked structures. The sum of the voltage potentials generated by solar cell units 28A-28C must exceed the potential of rechargeable cell 12 by the threshold voltage of blocking diode 32 in order for rechargeable battery 10 to accept charge.

In addition to being interconnected in a series circuit, solar cell units 28A-28C are physically positioned on battery 10 in such a manner that their adjacent edges are non-parallel to axis 14. In the embodiment shown, cells 28A-28C are positioned on side wall 20 in such a manner that their edges are generally perpendicular to axis 14, and extend around a circumference of cell 12. An imaginary line parallel to axis 14 and positioned across the exterior surface of rechargeable battery 10 will therefore intersect at least a portion of each solar cell unit 28A-28C. In other words, solar cell units 28A-28C are physically positioned in series along the length of cell 12. Although each solar cell unit 28A-28C is a unitary device in the illustrated embodiment, each unit could also be formed from a plurality of discrete solar cells positioned about the circumference of cell 12 and interconnected in a parallel circuit.

Bus bars 29 and 31 can be fabricated of any desired electrically conductive material such as metal or conductive transfer adhesive (CTA) films. In one embodiment, 3M SCOTCHLINK Brand electrical connector tape is used for bus bars 29 and 31.

Tubular wrapper 30 can be positioned around solar cell units 28A-28C, and "heat shrunk" to secure the solar cells in place on case side wall 20. Commercially available heat shrinkable polymer materials can be used for this purpose. Wrapper 30 must of course be generally transparent to visible light to permit propagation of radiation to solar cell units 28A-28C. Small amounts of printing or other labeling on wrapper 30 can also be included without significantly detracting from the amount of light received by solar cell units 28A-28C. Pressure sensitive or other adhesives can also be used to fasten solar cell units 28A-28C to cell 12.

By way of example, a standard D size Ni-Cd rechargeable cell 12 having a typical charge capacity of 1.2 amp-hour (AH) can be charged to full capacity from a totally drained condition by applying a 50 mA DC charging current for thirty-two hours. The minimum required charging voltage using a crystalline silicon blocking diode (0.6 volt threshold) is about 2.0 volts. Using an a-Si:H blocking diode, a minimum voltage of about 2.2 volts is necessary. This can be accomplished with four, series-connected, ten square centimeter, three percent efficient a-Si solar cells under AM1 (100 mW/cm$^2$) illumination. Ten percent efficient solar cells can provide the same result under AM1 illumination with solar cells of three square centimeters.

When charged, battery 10 can be used in a conventional manner to power any electrical device. Current from cell 12 is prevented from flowing through solar cell units 28A-28C by blocking diode 32. Blocking diode 32 thereby prevents cell 12 from being discharged when battery 10 is placed in the dark. When battery 10 is removed from the device it is powering and exposed to natural or artificial light, or if the device on which battery 10 is mounted permits the propagation of light (e.g. a flashlight having a clear case), photocurrent generated by solar cell units 28A-28C will charge cell 12. Due to the orientation of solar cell units 28A-28C, radiation direct from the light source will impinge upon at least a portion of each solar cell unit 28A-28C, unless its longitudinal axis is oriented directly toward the source. All solar cell units 28A-28C will therefore receive more or less a similar distribution of radiant energy, and generate about the same amount of photocurrent. As a result, each solar cell unit 28A-28C will present a similar low value of electrical resistance in the circuit shown in FIG. 3, resulting in an increased charging efficiency over prior art arrangements. Detrimental effects associated with non-uniform light distribution upon solar cells, which can result when position-sensitive rechargeable batteries are not properly oriented with respect to the source of radiation, are thereby alleviated.

Light rechargeable batteries such as 10 have significant utility as "always charged" batteries. They can be used in conjunction with batteries of any voltage, including battery packs/modules in flashlights, or in posts or other devices housing electronic transmitters or sensors. Posts or other elongated members used in conjunction with rechargeable cells and having solar cell units mounted thereon in the manner described above will also have the advantageous features described herein. Rechargeable batteries 10 will therefore remain fully charged on store shelves, dashboards, aboard ships, window shelves, and in transparent battery compartments on portable appliances or field electronic equipment. Rechargeable battery 10 is further enhanced by the fact that its charging behavior is relatively insensitive to its orientation relative to the source of light. Light rechargeable batteries 10 are charged-maintained at no cost to the user. Even "non-chargeable" batteries can therefore be made economically rechargeable. No additional equipment such as a charger unit is required. Any number of batteries 10 can therefore be charged simultaneously. Solar cell units 28A-28C of the thin-film type described are very attractive and durable. Solar cell units 28A-28C of the thin-film variety are relatively inexpensive and can be easily wrapped around the circumference of case side wall 20. Battery 10 can therefore be manufactured at low additional cost beyond that of cell 12 itself.

Although the present invention has been described with reference to preferred embodiments, those skilled in the art will recognize that changes may be made in form and detail without departing from the spirit and scope of the invention.

What is claimed is:

1. A light-rechargeable battery, including:
   a tubular rechargeable cell;
   a pair of terminals extending from the cell;
   two or more solar cell units interconnected in a series circuit between the terminals, each solar cell unit substantially extending around a circumference of the rechargeable cell; and
   fastener means for fastening the solar cell units to the rechargeable cell.

2. The light-rechargeable battery of claim 1 and further including a blocking diode connected in the series circuit with the solar cell units.

3. The light-rechargeable battery of claim 1 wherein the fastener means includes a transparent shrink wrap cover.

4. The light-rechargeable battery of claim 1 wherein each solar cell unit extends completely around the circumference of the rechargeable cell.

5. The light-rechargeable battery of claim 1 wherein:
   the rechargeable cell includes a case; and the solar cell units are fastened to an exterior surface of the case.

6. The light-rechargeable battery of claim 1 and further including bus bars coupling the solar cell units to the terminals.

7. The light-rechargeable battery of claim 1 wherein the solar cell units include thin-film solar cells fabricated on a flexible substrate.

8. A light-rechargeable battery including:

a rechargeable cell having an elongated, tubular case characterized by a longitudinal axis;

a pair of terminals extending from the rechargeable cell;

two or more thin-film solar cells fabricated on a flexible substrate, interconnected in a series circuit between the terminals, and circumferentially positioned around the rechargeable cell on an exterior surface of the case in a generally perpendicular orientation to the longitudinal axis;

a blocking diode connected in the series circuit with the solar cells;

bus bars coupling the solar cells to the terminals; and fastener means for securing the solar cells to the case of the rechargeable cell.

9. The light-rechargeable battery of claim 8 wherein the fastener means includes a transparent shrink wrap cover.

* * * * *